(12) United States Patent
Mittlesteadt et al.

(10) Patent No.: US 6,272,755 B1
(45) Date of Patent: Aug. 14, 2001

(54) EXTENDABLE TOOL LOCK (75) Inventors: Vern Mittlesteadt, Reedsburg; Mark D. Schaefer, Waukesha; Brian W. Hubbard, East Troy, all of WI (US)

(73) Assignee: Alterra Holdings Corporation, Portland, OR (US)

( * ) Notice: Subject to any disclaimer, the term of this patent is extended or adjusted under 35 U.S.C. 154(b) by 0 days.

(21) Appl. No.: 09/317,509

(22) Filed: May 24, 1999

Related U.S. Application Data (63) Continuation of application No. 08/897,821, filed on Jul. 12, 1997, now Pat. No. 5,933,965.

(51) Int. Cl.[7] .................. B26B 13/26; B25G 3/00
(52) U.S. Cl. .................. 30/249; 30/296.1; 403/308; 403/378
(58) Field of Search .................. 30/249, 296.1; 403/300, 308, 378; 16/429

(56) References Cited

U.S. PATENT DOCUMENTS

| | | |
|---|---|---|
| 1,234,455 | 7/1917 | Fox . |
| 1,951,754 * | 3/1934 | Gilbert .................. 403/308 |
| 2,606,050 | 8/1952 | Morris et al. . |
| 2,630,730 | 3/1953 | Thornton . |
| 4,547,101 | 10/1985 | Dowdakin, Sr. . |
| 4,576,498 | 3/1986 | Rassieur . |
| 4,802,783 | 2/1989 | Erikson . |
| 4,899,446 * | 2/1990 | Akiba et al. .................. 30/296.1 |
| 4,976,031 * | 12/1990 | Miller .................. 30/296.1 |
| 5,168,693 | 12/1992 | Ingvardsen . |
| 5,228,202 * | 7/1993 | Liao .................. 30/296.1 |
| 5,404,616 | 4/1995 | Carmien . |
| 5,562,360 | 10/1996 | Huang . |
| 5,588,772 | 12/1996 | Johnson, Jr. . |
| 5,603,584 | 2/1997 | Schuele . |
| 5,926,961 * | 7/1999 | Uhl .................. 30/296.1 |
| 5,933,965 | 8/1999 | Lindén et al. . |

* cited by examiner

*Primary Examiner*—Hwel-Slu Payer
(74) *Attorney, Agent, or Firm*—Foley & Lardner (57) ABSTRACT

A tool for performing lopping, pruning and similar operations includes a housing assembly formed of a pair of telescoping tubular sections. The tool also includes a tool head, a head line and an actuating line. The tool head, which is connected to one end of a tubular section, preferably includes a spring-biased blade coupled to the head line which is connected to a slidable block. The actuating line, while engaging the slidable block so that tensioning the actuating line causes movement of the blade, is also slidable relative to the block upon relative movement of the tubular sections.

35 Claims, 6 Drawing Sheets

EXTENDABLE TOOL LOCK

This application is a continuation of U.S. application Ser. No. 08/897,821, filed on Jul. 12, 1997 and issued on Aug. 10, 1999 as U.S. Pat. No. 5,933,965, entiled EXTENDABLE TOOL.

FIELD OF THE INVENTION

The present invention relates generally to the art of telescoping tools, particularly of the type including a pole or tubular tool support for reaching areas remote from the user of the tool. More particularly, the invention relates to a telescoping tool, such as for example a tree pruner, having an actuating line received within the tubular tool support, the tool support being capable of being extended to greater heights while the actuating line remains taut.

BACKGROUND OF THE INVENTION

A great number and variety of devices having telescoping handles have been proposed and are commercially available for performing a variety of operations such as tree pruning. Specifically, pole-mounted pruning tools are widely used by arborists and others to control foliage growth at substantial heights. Conventional tree pruners usually comprise an elongated shaft or tube on the upper end of which a lopping mechanism is mounted. The lopping mechanism includes a hook-shaped jaw and a pivotal blade. The blade is typically biased in an open position by a spring, and includes a lever arm extension attached to a cord or rope. To sever a tree branch or other object, a user places the jaw about the object and pulls the actuating cord to pivot the blade toward the jaw. A lopper generally of this type is described in U.S. Pat. No. 5,241,752, issued on Sep. 7, 1993 to Lutzke et al.

Because tree pruners of the type described above cannot always permit the remote trimming of branches and the like, a ladder or stool is typically needed to allow the user to reach an otherwise inaccessible branch. This shortcoming has already been recognized by those skilled in the art, as explained in U.S. Pat. No. 5,084,975, issued on Feb. 4, 1992 to Melter which covers an extendable tree pruner. Specifically, Melter discloses a tree pruner having a pair of telescoping tubes in which cables coupling an actuator and a shears are received. A compensating pulley permits extension of the telescoping tubes, while ensuring sufficient tension on the cord when a user desires to make a cut. As is readily apparent, the Melter device requires a number of compensating pulleys thereby adding to the complexity and cost of that item.

Thus, it is desirable to provide a tree pruning tool which can alleviate the problems associated with prior art devices to effectuate certain operations more efficiently and with less effort, without undesirably affecting the performance of the tool or unduly increasing its cost.

SUMMARY OF THE INVENTION

The extendable tool in accordance with the present invention is designed to facilitate the performance of certain operations, such as the caring of trees and plants growing to substantial heights tree, where an extended reach is required.

In accordance with one aspect of the invention, the tool is configured as a tree pruner having a pair of telescoping tubular sections associated with a lopping mechanism. The lopping mechanism, which is preferably spring-biased, is connected to a slidable block via a head line. The slide block is engaged by an actuating line which is connected to the other of the tubular sections, so that actuation of the actuating line will cause operation of the lopping mechanism, but telescoping movement of the tubular sections will cause slidable movement of the actuating line with respect to the slidable block.

In accordance with a further aspect of the invention, the tool includes a slidable handle connected to the actuating line.

In accordance with another aspect of the invention, the tubular sections are teardrop-shaped, at least one of the tubular sections having a flat region to facilitate passage of the actuating line therebetween.

Other advantages of the present invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the present invention will hereinafter be described in conjunction with the appended drawings, wherein like numerals denote like elements and.

DETAILED DESCRIPTION OF A PREFERRED EXEMPLARY EMBODIMENT

The present invention relates to extendable tools useful in remotely performing other certain operations in areas that are distant from the user of such tools. In a particular illustration of the extendable tool concept, the tool includes a pair of tubular sections associated with a device for lopping branches or the like from a tree. However, while the invention as described herein will often be referred to a tree pruning device, those skilled in the art will appreciate that the telescoping pole assembly described herein and its principle of operation can be broadly applied to a wide variety of other telescoping implements generally.

Figure 1:
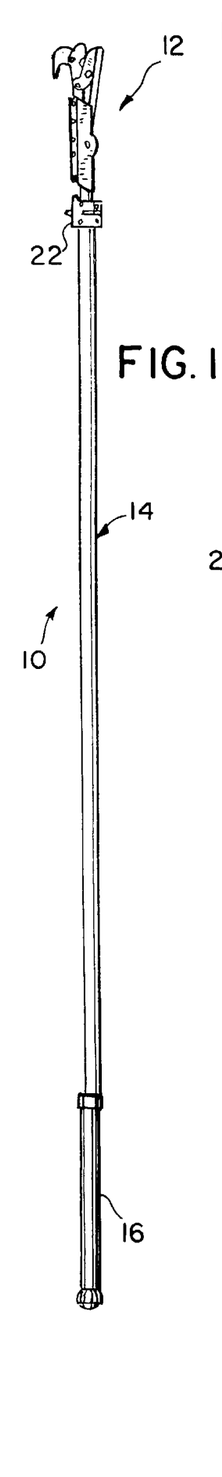
FIG. 1 is an elevational view of the Tool with Extendable Handle of the present invention, the Tool being shown in the retracted configuration.
Figure 2:
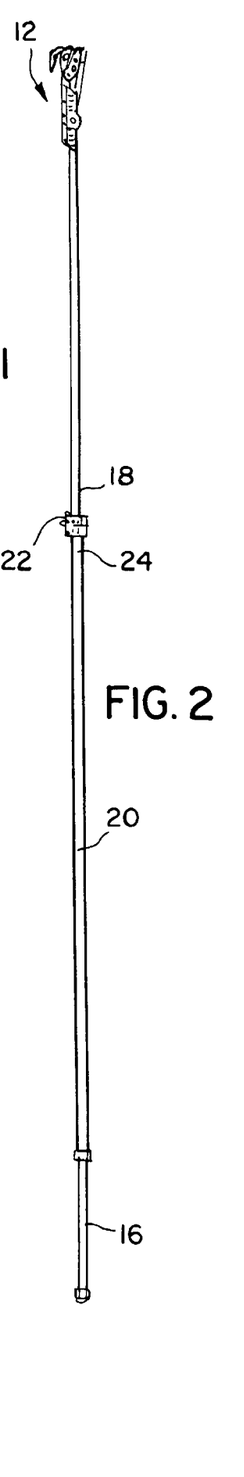
FIG. 2 is an elevational view of the Tool with Extendable Handle of the present invention, the Tool being shown in the extended configuration.
Figure 3:
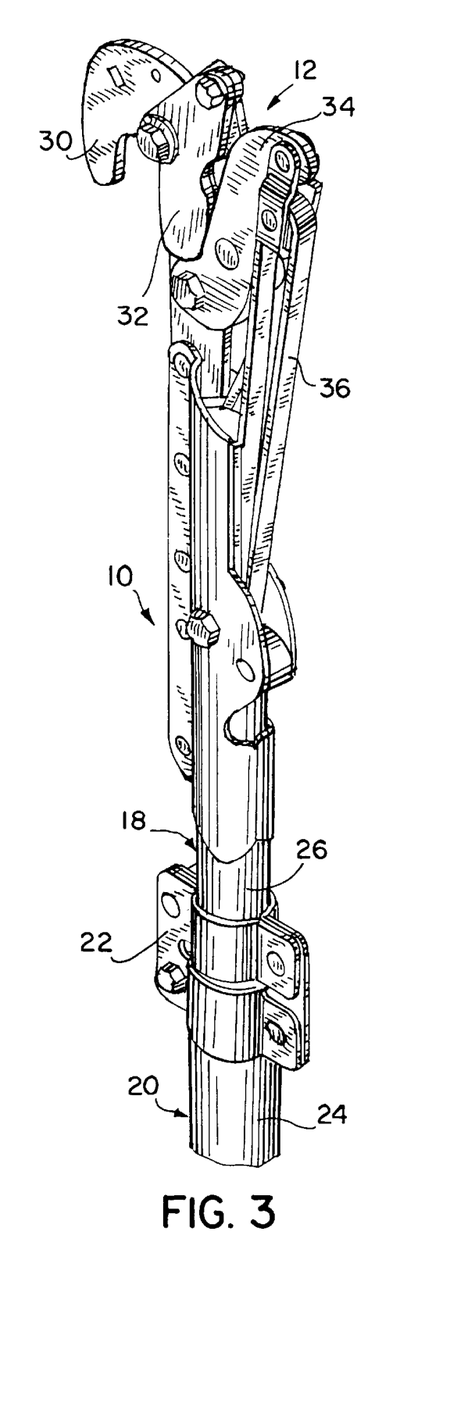
FIG. 3 is an enlarged view of the lopping mechanism of the tool of the present invention.

Referring to the Figures, a tool generally designated as 10 for performing lopping, trimming and pruning operations includes a lopping mechanism 12, an elongate housing assembly 14 and an actuating handle 16. Housing assembly 14 is preferably a hollow tubular structure comprising an upper tubular section 18 slidably received within a lower tubular section 20. A clamp mechanism or securing collar 22 is provided on an upper region 24 of lower tube 20 for setting and maintaining housing assembly 14 at a desired length. Thus, collar 22 may be loosened around upper tube 18 to permit tube 18 to be slid into a desired position extending from lower tube 20 as shown in FIG. 2. Once tube 18 is in the desired position, collar 22 may be tightened around tube 18 to secure and maintain the position. Collar 22 may be of generally known design, such as the clamp described in U.S. Pat. No. 5,084,975, which is hereby incorporated herein by reference.

As illustrated in the FIGURES, lopping mechanism 12 is supported in an outer region 26 of housing assembly 14. Lopping mechanism 12 includes at least a severing tool for performing lopping, pruning and similar operations. In the preferred embodiment illustrated, mechanism 12 includes a hook-shaped jaw 30 coupled to a movable blade 32. As with conventional lopping tools, jaw 30 may be placed around a limb or branch to be cut and blade 32 moved toward jaw 30 to sever the branch. Blade 32 is connected to an actuating lever 34 that is, in turn, engaged by a flexible head line 36 as described below. Lopping mechanism 12 may also include additional tools, such as a saw blade 38.

Head line 36, which may be conveniently configured as a flat strap (for reasons that will be explained below), is anchored at one end 40 to lopping mechanism 12. The other end 42 of head line 36 is connected to a slide block 44 which is slidably received within tubular section 18. Slide block 44 also includes a pulley 48 rotatably mounted on block 44 and configured to guide an actuating line 50 which may also be formed as a strap.

Figure 4A:
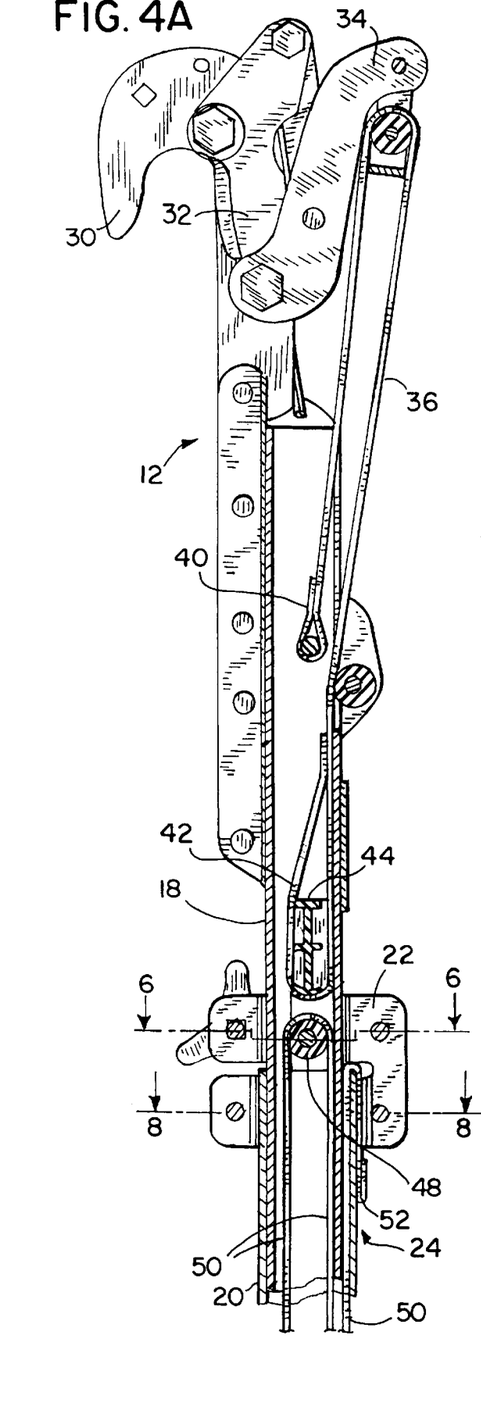
FIG. 4A is a partial cross-sectional view of the lopping mechanism shown in FIG. 3.
Figure 4B:
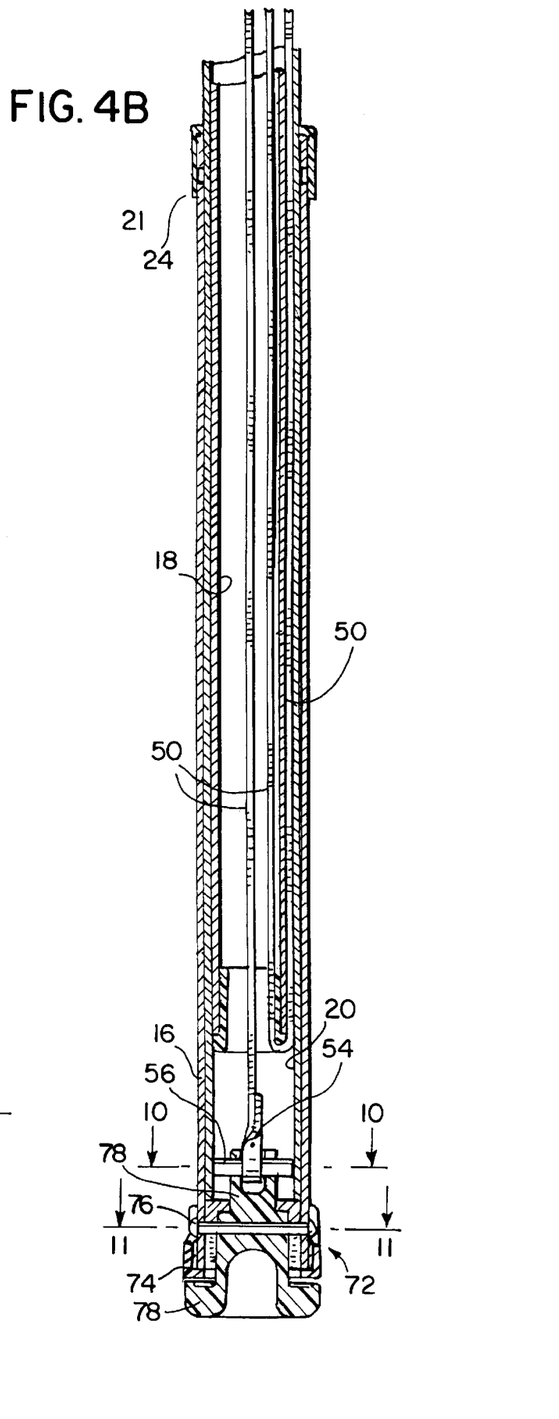
FIG. 4B is a partial cross-sectional view of the actuating handle section of the tool of the present invention.
Figure 8:
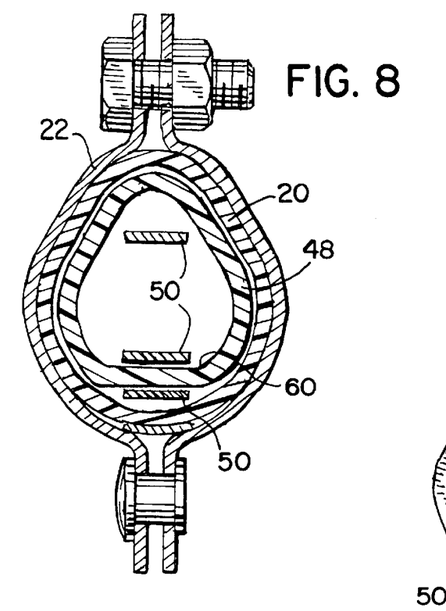
FIG. 8 is a cross-sectional view taken along line 8—8 shown in FIG. 4A.
Figure 9:
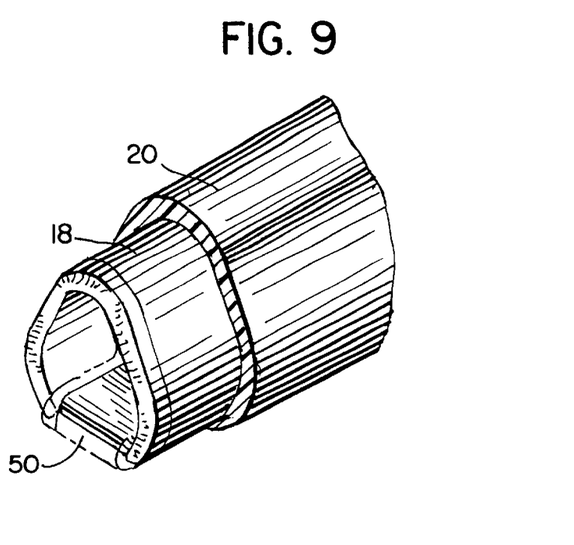
FIG. 9 is a perspective view of the bottom region of the upper tube showing the strap passing between the upper and lower tubes.
Figure 10:
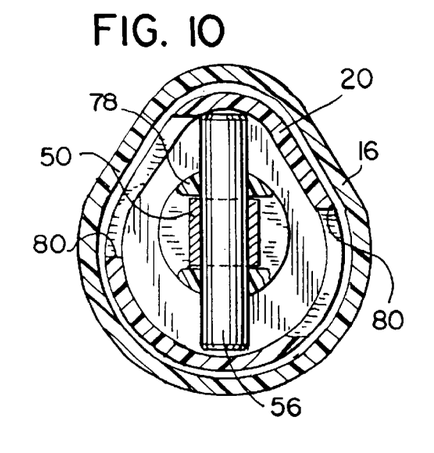
FIG. 10 is a cross-sectional view taken along line 10—10 shown in FIG. 4B.
Figure 11:
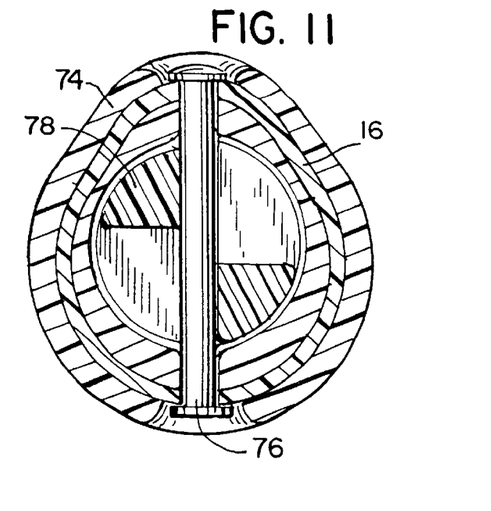
FIG. 11 is a cross-sectional view taken along line 11—11 shown in FIG. 4B.
Figure 12:
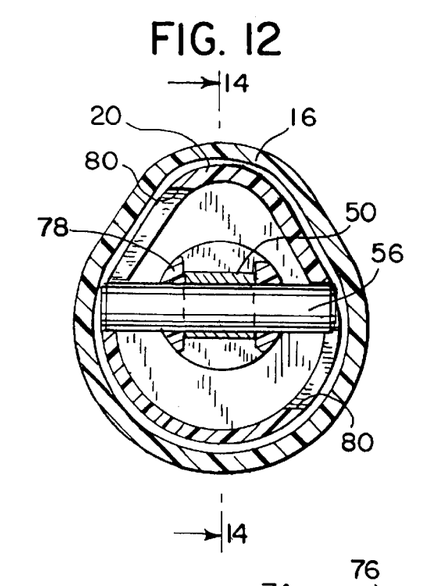
FIG. 12 is a cross-sectional view taken along line 10—10 shown in FIG. 4B, with the actuating handle shown in locked position.
Figure 13:
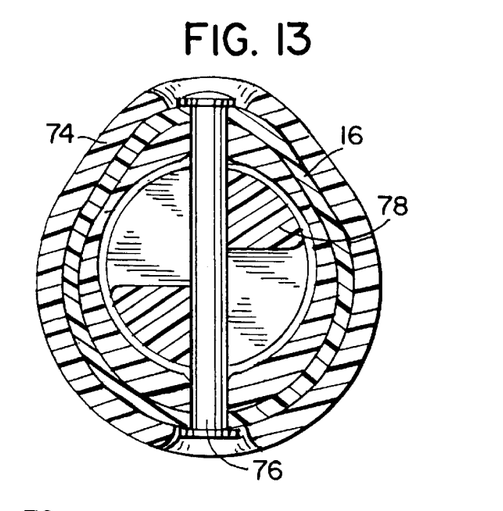
FIG. 13 is a cross-sectional view taken along line 11—11 shown in FIG. 4B, with the actuating handle shown in locked position.
Figure 14:
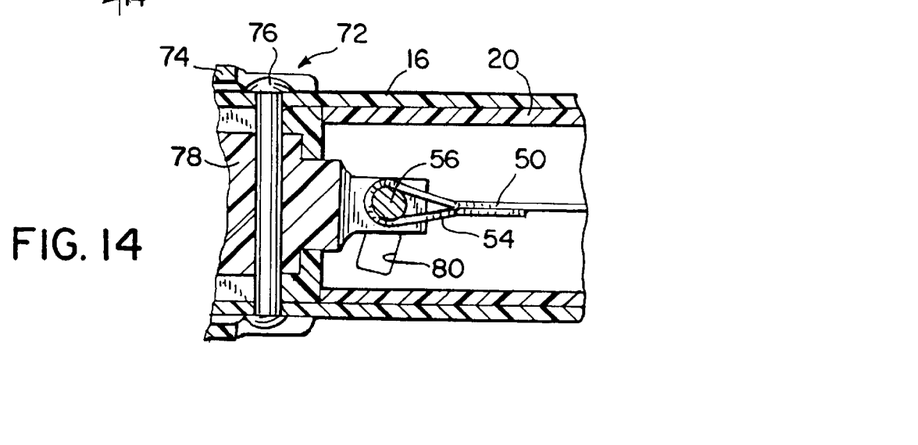
FIG. 14 is a cross-sectional view taken along line 14—14 shown in FIG. 12.
Figure 15:
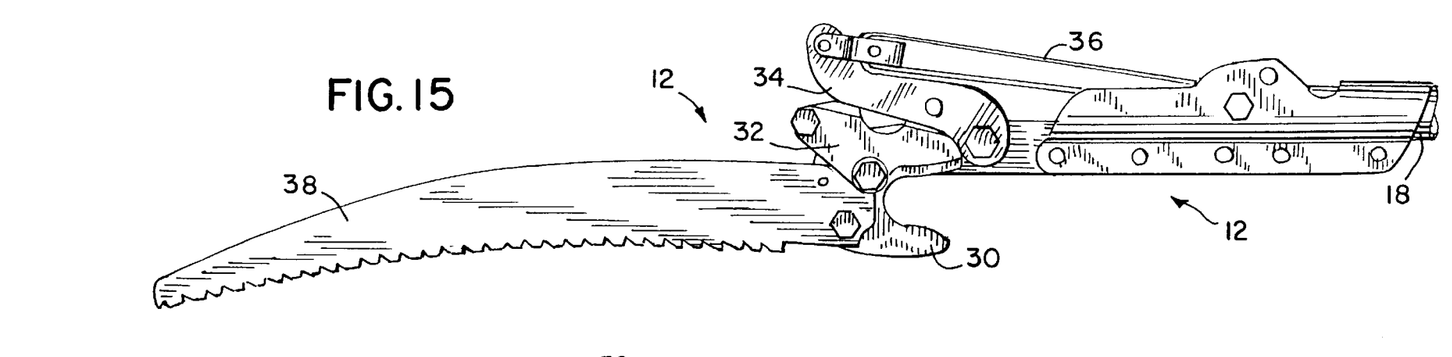
FIG. 15 is a front elevational view of the lopping mechanism of the tool of the present invention, the mechanism being associated with a sawing implement.

Actuating line 50 is secured at one end 52 to lower tubular section 20. Preferably, the other end 54 of actuating line 50 is secured to handle 16 for example by a pin 56 and a clevis on end cap 78 arrangement as particularly shown on FIG. 4B. As shown schematically on FIGS. 5A–5C, actuating line 50 extends from pin 56 upwardly within lower tubular section 20 into upper tubular section 18, around pulley 48 downwardly into upper section 18, around the lower end 58 of upper section 18, upwardly in between upper section 18 and lower section 20 around upper region 24 of lower tubular section 20 to which it is attached at end 52. As indicated earlier, actuating line 50 is preferably a substantially flat strap and tubular sections 18, 20 are preferably teardrop-shaped as shown in FIGS. 6, 8, and 9, upper section 18 having a flat region 60 to facilitate passage of actuating line 50 between tubular sections 18, 20 as shown in FIG. 8.

Figure 5A:
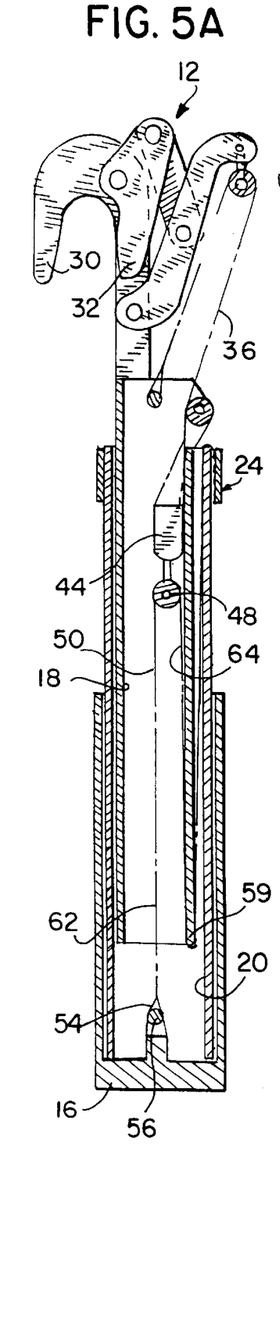
FIG. 5A is a schematic cross-sectional view of the tool of the present invention represented in retracted configuration.
Figures 5B, 5C:
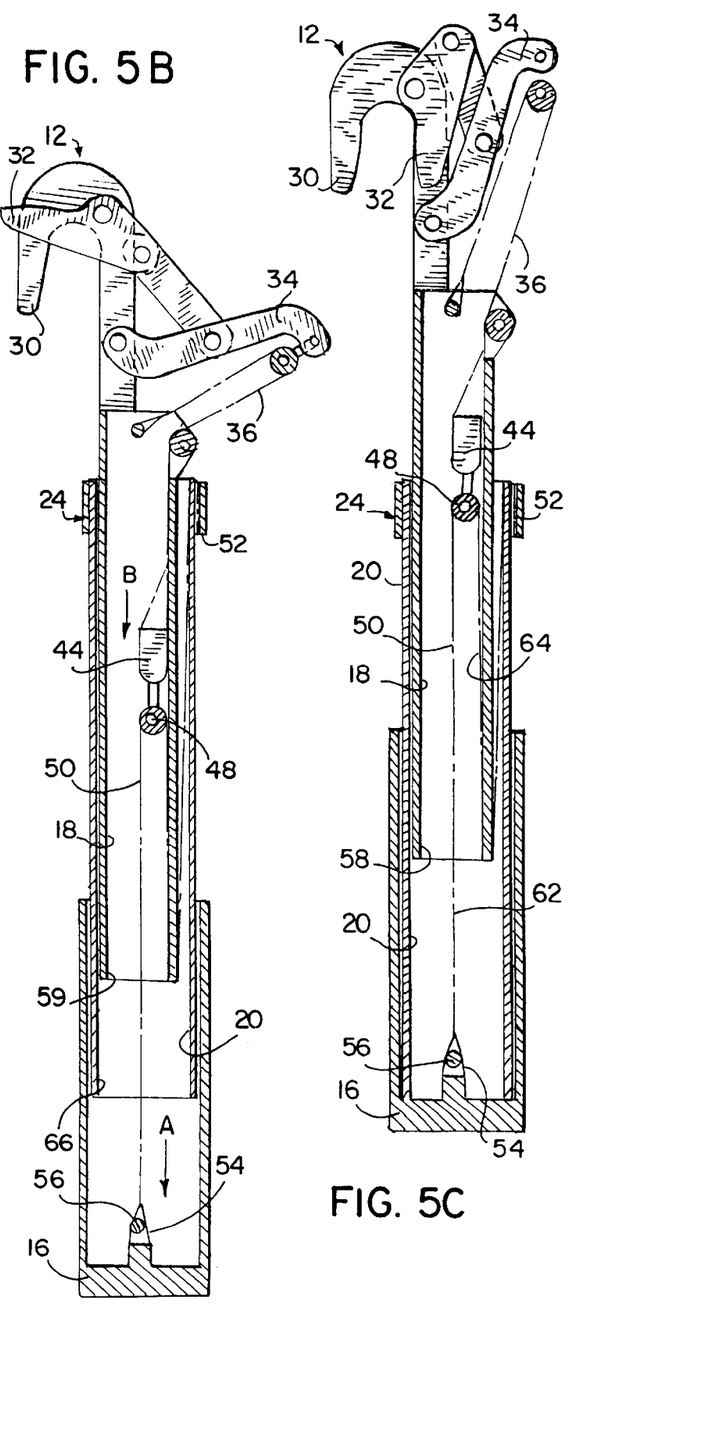
FIG. 5B is a schematic cross-sectional view of the tool of the present invention represented in retracted configuration and with the handle actuated to sever an item to be cut.
FIG. 5C is a schematic cross-sectional view of the tool of the present invention represented in partially extended configuration.
Figures 6, 7:
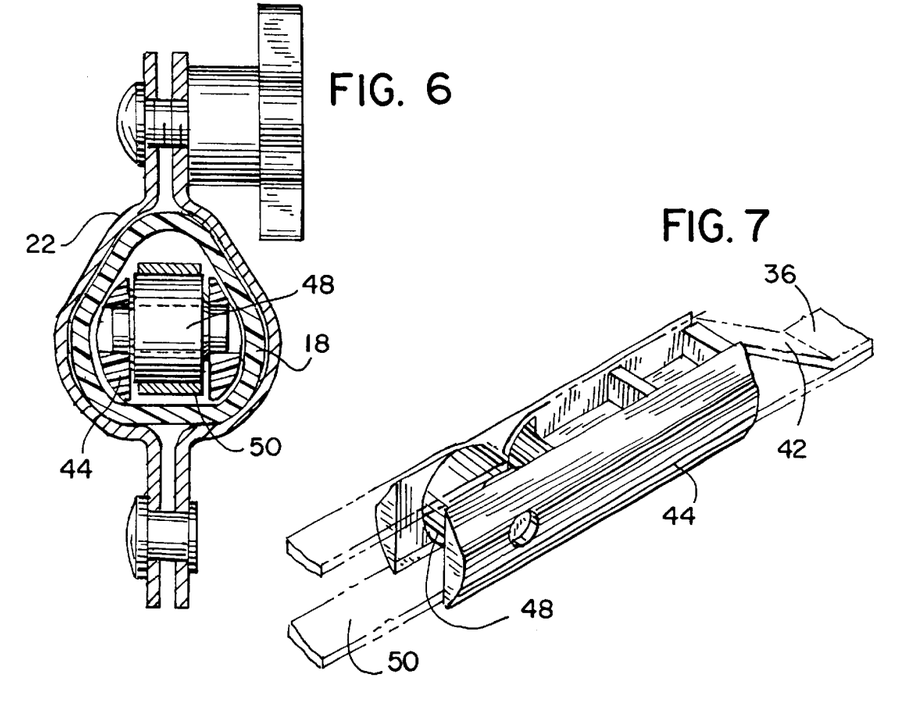
FIG. 6 is a cross-sectional view taken along line 6—6 shown in FIG. 4A.
FIG. 7 is a perspective view of the slide block received within the upper tube of the tool of the present invention.

As a result and as illustrated in FIGS. 5A–5C, actuation of handle 16 in the direction of arrow A shown on FIG. 5B will cause slidable block 44 to slide downwardly within upper section 18 in the direction of arrow B. This will cause head strap 36 to pull on lever 34 which in turn causes blade 32 to move toward jaw 30. Conversely, when the downward pulling force is no longer exerted on handle 16, handle 16 will mover upwardly in a direction opposed to arrow A, thereby causing block 44 to slide within tubular section 18 in a direction opposed to arrow B, thereby causing blade 32 (which is biased away from jaw 30 by conventional means) to return to its initial position as shown in FIG. 5A or 5B.

When it becomes necessary for the user to telescope housing assembly 14, the user will typically loosen collar 22 to pull upper tubular section 18 out of lower section 20. As a result, since actuating line 50 is connected at end 52 to lower section 20 and at the other end 54 to handle 16, pulley 48 will roll over a portion of actuating line 50 and line 50 will roll around lower end 58. This will result in an increase in the linear amount 62 of line 50 separating pulley 48 from pin 56, and in a directly related decrease in the linear amount 64 of line 50 separating pulley 48 from end 52, as clearly illustrated by a comparison of FIGS. 5A and 5C.

Figures 16, 17:
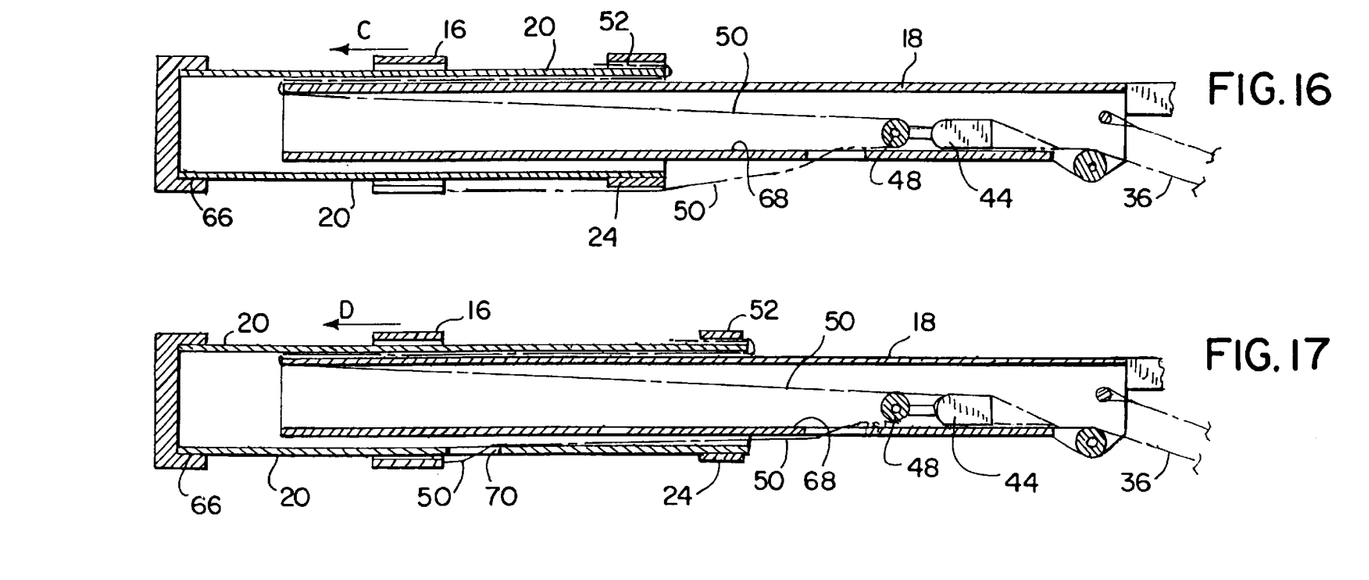
FIG. 16 is a schematic cross-sectional view of a first alternate embodiment of the actuating handle mechanism.
FIG. 17 is a schematic cross-sectional view of a second alternate embodiment of the actuating handle mechanism.

We now turn to two alternative embodiments of the present invention and refer more particularly to FIGS. 16 and 17, comparing these two other embodiments to the preferred embodiment illustrated schematically in FIG. 5C. As shown in FIG. 16, handle 16 is configured as a sleeve slidably disposed intermediate upper region 24 and distal end 66. Actuating line 50 which is connected is as in the preferred embodiment to tubular section 20 passes around pulley 48 and extends through a wall 68 of section 20 and terminates at end 54 which is connected to sleeve-type handle 16. In the case of the second alternate embodiment which is illustrated in FIG. 17, instead of being directly connected to handle 16, line 50 further passes between tubular sections 18, 20 exiting therefrom through an aperture 70 formed in lower section 20. Both of these alternate embodiments allow actuation of actuating line 50 to be applied by the user at a point located closer to upper region 24 than in the case of the preferred embodiment, thereby facilitating in certain cases actuation of blade 32.

Finally, as indicated above, lopping mechanism 12 may also include a saw blade 38. However, in such event and particularly in the case of the preferred exemplary embodiment wherein handle 16 is positioned proximate distal end 66, to effectuate a sawing operation it is desirable to lock handle 16 relative to housing assembly 14. Toward that end, tool 10 also includes a lock generally designated as 72. Lock 72 specifically includes a collar 74 connected to handle 16 by a pin 76. Lock 72 further includes an end cap 78 which is rotatable relative to collar 74, and a slot 80 formed in lower tubular section 20. Accordingly, to lock handle 16 and lower section 20 together, the user will turn end cap 78 approximately one quarter turn so that the opposed ends of pin 56 become lodged in slot 80 thereby suppressing translation movement of handle 16 relative to lower tubular portion 20. Furthermore, to prevent accidental unlocking of lock 72 during normal use of tool 10, the axis of slot 80 forms a shallow angle with an axis drawing perpendicular to the longitudinal axis of lower tubular section to cause an interference fit between the ends of pin 56 and slot 80.

It is understood that the above description is of a preferred exemplary embodiment of the present invention, and that the invention is not limited to the specific forms described. For example, while the invention has been described in association with a device taking the form of a tree pruner, it can be used with other items as well. In addition, tubular sections can take other shapes so long as they can be nested relative to one another and in a way that will allow free passage of the actuating line. As a result, slidable block 44 may need to be reconfigured while preserving its essential functions that are described in above. Nevertheless, it should be understood that these and other substitutions, modifications, changes and omissions may be made in the design and arrangement of the elements disclosed herein without departing from the scope of the appended claims.

What is claimed is:

1. An extendable tool comprising:
    an inner tubular section telescopingly received within an outer tubular section; and
    a lock mechanism configured to prevent movement of the inner tubular section relative to the outer tubular section where the lock mechanism is in a locked condition, the lock mechanism including;
        an end cap rotatable relative to the outer tubular section;
        a slot formed in the inner tubular section;
        a lock pin rotatably coupled to the end cap, the lock pin configured to be selectively engaged with the slot to prevent relative movement between the inner tubular section and the outer tubular section.

2. The tool of claim 1 wherein the axis of the slot is not perpendicular to the longitudinal axis of the inner tubular section.

3. The tool of claim 1 further comprising:
    a collar that is coupled to the outer tubular section; and
    a mounting pin rotatably coupling the end cap to the outer tubular section, the mounting pin being retained by the collar.

4. An extendable tool, comprising:
    at least two telescoping tubular members having a longitudinal axis;
    a rotatable actuator;
    a restraining member configured to allow the actuator to rotate and substantially suppresses motion of the actuator along the longitudinal axis of the at least two telescoping tubular members;
    an aperture in at least one of the at least two tubular members; and
    a locking member configured to selectively engage the aperture to prevent relative movement between the at least two tubular members when the rotatable actuator moves the locking member to selectively engage the aperture.

5. The extendable tool of claim 4 wherein the rotatable actuator is an end cap.

6. The extendable tool of claim 4 wherein the aperture is a slot.

7. The extendable tool of claim 6 wherein the slot is at an angle with respect to an axis perpendicular to the longitudinal axis of the at least two telescoping tubular members.

8. The extendable tool of claim 4 wherein the locking member is a pin.

9. The extendable tool of claim 4 wherein an interference fit occurs between the locking member and the aperture.

10. The extendable tool of claim 4 wherein at least one of the at least two telescoping tubular members is configured to have a tool attached thereto.

11. The extendable tool of claim 4 further comprising a collar configured to couple the restraining member to one of the at least two telescoping tubular members.

12. An extendable tool, comprising:
    at least two telescoping tubular members;
    an aperture in at least one of the at least two tubular members; and
    a locking mechanism configured to selectively prevent relative movement between the at least two telescoping tubular members, the locking mechanism including,
        an actuator;
        a restraining member configured to allow the actuator to rotate and substantially suppresses motion of the actuator along the longitudinal axis of the at least two telescoping tubular members, and
        a locking member configured to selectively engage the aperture to prevent relative movement between the at least two tubular members when the actuator moves the locking member to selectively engage the aperture.

13. The extendable tool of claim 12 wherein the actuator is rotatable.

14. The extendable tool of claim 12 wherein the aperture is a slot.

15. The extendable tool of claim 14 wherein the slot is at an angle with respect to an axis perpendicular to the longitudinal axis of the at least two telescoping tubular members.

16. The extendable tool of claim 12 wherein the locking member is a pin.

17. The extendable tool of claim 12 wherein at least one of the tubular members is configured to have a tool attached thereto.

18. The extendable tool of claim 12 further comprising a collar configured to couple the restraining member to one of the at least two telescoping tubular members.

19. An extendable tool, comprising;
    at least two telescoping tubular members having a longitudinal axis;
    an aperture in at least one of the at least two tubular members; and
    a locking mechanism configured to lock the at least two telescoping tubular members from substantial telescopic movement, the locking member including,
        an actuator,
        a restraining member configured to allow the actuator to rotate and substantially suppresses motion of the actuator along the longitudinal axis of the at least two telescoping tubular members, and
        a locking member configured to selectively engage the aperture to prevent relative movement between the at least two tubular members when the actuator moves the locking member to selectively engage the aperture.

20. The extendable tool of claim 19 wherein the aperture is a slot at an angle with respect to an axis perpendicular to the longitudinal axis of the at least two telescoping tubular members.

21. The extendable tool of claim 19 wherein the locking member is a pin.

22. The extendable tool of claim 19 wherein an interference fit occurs between the locking member and the aperture.

23. The extendable tool of claim 19 further comprising a collar configured to couple the restraining member to one of the at least two telescoping tubular members.

24. A locking mechanism for locking at least two telescoping tubular members having a longitudinal axis and an aperture in at least one of the at least two tublar members comprising:
- a rotatable actuator;
- a restraining member configured to allow the actuator to rotate and substantially suppresses motion of the actuator along the longitudinal axis of the at least two telescoping tubular members; and
- a locking member configured to selectively engage the aperture to prevent relative movement between the at least two tubular members when the rotatable actuator moves the locking member to selectively engage the aperture.

25. The mechanism of claim 24 wherein the rotatable actuator is an end cap.

26. The mechanism of claim 24 wherein the locking member is a pin.

27. The mechanism of claim 24 further comprising a collar configured to couple the restraining member to one of the at least two telescoping tubular members.

28. The mechanism of claim 27 wherein the restraining member comprises a pin.

29. A locking mechanism for selectively preventing relative movement between at least two telescoping tubular members and a aperture in at least one of the at least two tubular members, comprising:
- an actuator;
- a restraining member configured to allow the actuator to rotate and substantially suppresses motion of the actuator along the longitudinal axis of the at least two telescoping tubular members; and
- a locking member configured to selectively engage the aperture to prevent relative movement between the at least two tubular members when the actuator moves the locking member to selectively engage the aperture.

30. The mechanism of claim 29 wherein the actuator is rotatable.

31. The mechanism of claim 29 wherein the locking member is a pin.

32. The mechanism of claim 29 further comprising a collar configured to couple the restraining member to one of the at least two telescoping tubular members.

33. A locking mechanism for locking at least two telescoping tubular members having a longitudinal axis of an extendable tool and an aperture in at least one of the at least two tubular members, and comprising:
- an actuator;
- a restraining member configured to allow the actuator to rotate and substantially suppresses motion of the actuator along the longitudinal axis of the at least two telescoping tubular members; and
- a locking member configured to selectively engage the aperture to prevent relative movement between the at least two tubular members when the actuator moves the locking member to selectively engage the aperture.

34. The mechanism of claim 33 wherein the locking member is a pin.

35. The mechanism of claim 33 further comprising a collar configured to couple the restraining member to one of the at least two telescoping tubular members.

* * * * *